United States Patent Office 3,152,061
Patented Oct. 6, 1964

3,152,061
PERMSELECTIVE CATIONIC MEMBRANE AND
PROCESS FOR PRODUCING THE SAME
Akira Nishihara, Yokohama, Japan, assignor to Asahi
Garasu Kabushiki Kaisha, Tokyo, Japan, a corporation
of Japan
No Drawing. Filed Dec. 13, 1960, Ser. No. 75,477
Claims priority, application Japan, Dec. 15, 1959,
34/38,767
16 Claims. (Cl. 204—296)

The present invention relates to a process for producing insoluble cationic polyelectrolytes in a membrane form and to membranes produced by the said process.

An object of the present invention is to provide a membrane of new insoluble cationic polyelectrolyte selectively permeable to anions under the action of electric current.

A further object of the present invention is to provide a membrane of new insoluble cationic polyelectrolyte selectively permeable to specific ions by dialysis without the action of current.

Another object of the present invention is to provide a membrane of new insoluble cationic polyelectrolyte capable of concentrating and desalting an electrolyte solution under the action of electric current.

A further object of the present invention is to provide a membrane of insoluble cationic polyelectrolyte capable of recovering acids from a mixed solution of acids and salts or acids and water-soluble organic compound such as glucose without the action of current.

Other objects, advantages and features of the present invention will be apparent from the following description.

The present inventor has executed numerous experiments and laborious studies and came to the conclusion that the foregoing objects can be accomplished by an insoluble cationic polyelectrolyte produced according to a process wherein epoxy resin represented by the following general formula:

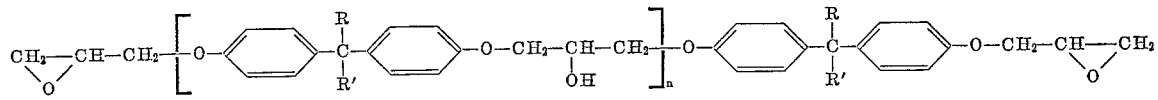

wherein R and R' are respectively selected from the group consisting of H, $CH_3$ and $C_2H_5$, and $n$ is 0 to 5.

Aliphatic polyamine and at least one of m-phenylene diamine and m-aminophenol are dissolved together in a suitable solvent, a reinforcing material is impregnated with the solution, the resin of the said material is cured and then the membrane thus obtained is treated with either of formaldehyde or acetaldehyde, or after the treatment with the said aldehyde, the anion-exchange group of the membrane is quaternized.

Further, the symbol $n$ as shown above represents an average of molecular formulas of all polyepoxy compounds constituting said epoxy resin.

The production of granular anion-exchange resin by making use of the reactivity of polyepoxy compounds has already been suggested in the specification of U.S. Patent No. 2,469,684. This process comprises reacting an alkylene polyamine containing an unsubstituted primary amino group with an organic compound containing a plurality of ethylene oxide groups and no solubilizing substituents, in molar proportions of from 2:1 to 3:1, ethylene oxide group-containing compound to alkylene polyamine to form a gel, heating the gel thus obtained, and granulating the heated gel. Such a process as described above cannot, however, be applied to the production of membrane-like ion-exchange resin and if a membrane be formed, it will immediately disintegrate or decompose in water.

It has been found that a membrane of insoluble cationic polyelectrolyte can be produced by impregnating a reinforcing material with a solution containing a polyepoxy compound having a large epoxide equivalent such as epoxy resin and an aliphatic amine curing agent, and curing the said material thus treated. The membrane thus produced possesses excellent mechanical and electrochemical properties and is suitable for various industrial uses. In the event of using an aromatic amine such as m-phenylene diamine instead of aliphatic amine, however, if the amount of the amine be small, the electric resistance of the membrane will be higher, and if the amount be larger, the membrane will readily disintegrate in water. When the membrane is further treated with formaldehyde, the disintegration in water will be avoidable, nevertheless the increase of the electric resistance will not be avoidable.

It has now been found that a membrane-like insoluble cationic polyelectrolyte having improved mechanical and electrochemical properties can be produced by using aliphatic amine and m-phenylene diamine and/or m-aminophenol as curing agent for epoxy resin and further by completing the resinification with formaldehyde or acetaldehyde. Moreover, it has been ascertained that a strong basicity can be imparted to the membrane thus produced, by quaternizing the anion-exchange groups in the membrane.

The term "epoxide equivalent" as used in the specification means the gram weight of epoxy resin containing one equivalent of the epoxy group.

Thus, the insoluble cationic polyelectrolyte of the present invention contains the amine groups of the aliphatic amine and m-phenylene diamine and/or m-aminophenol as ion-exchange group. It is assumed that the chain opening reaction of the epoxy group and the condensation of formaldehyde or acetaldehyde with amine respectively increase the mechanical strength of the polyelectrolyte and are useful for the improvement of electrochemical properties. Further, the reinforcing material can increase the mechanical strength of the membrane and makes it possible to produce a thinner membrane, particularly that having a lower resistance per unit area. As a result, the membrane in the present invention is extremely useful as diaphragm for electrodialysis, in which higher mechanical and electrical properties are required. Furthermore, it has now been found that the membrane of the present invention is also useful as diaphragm for selectively diffusing specific ions without the action of electric current.

It has already been known that a certain kind of ion permselective membrane is capable of being used in dialysis. However, it has not yet been known what kind of diaphragm is suitable for the specific purpose. In consequence of searching for a diaphragm selectively permeable by dialysis to acids from a mixed solution of acids and salts or of acids and water-soluble organic compound such as glucose, the present inventor has been led to a new discovery that an anion permselective membrane having a lower resistance per unit area and a higher anionic permselectively is suitable for the above object. That is to say, such a membrane allows anions to permeate as well as hydrogen ion to permeate at the same time and acts as a barrier against other cations and organic compounds. Thus, the present inventor has ascertained that the membrane of insoluble cationic polyelectrolyte in the present invention is excellent not only as anion permselective membrane but also extremely suitable as diaphragm for diffusion. This is assumed to be due to the fact that the production of membrane having a lower resistance per unit area and a higher anionic permselectivity has become possible as hereinbefore set forth by making use of the chain opening reaction of the epoxy group and the condensation reaction of an aldehyde with an amine.

The epoxy resin to be used in the present invention is represented by the general formula as described below and in general is such a resin as that formed by the reaction of bis (p-hydroxyphenyl)-methane or its alkyl derivative with epichlorohydrin.

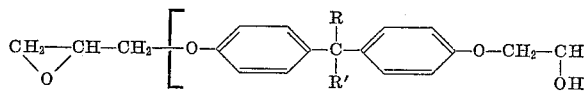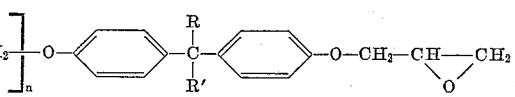

wherein R and R' are respectively selected from the group consisting of H, CH$_3$ and C$_2$H$_5$, and $n$ is 0 to 5.

Epoxy resin suitable for the use in the present invention is that which has an average composition corresponding to $n=0-5$, preferably $n=0-3$ and has 150 to 500 epoxide equivalent. In the epoxy resins corresponding to $n>5$, not only the viscosity of the solution increases but also the amount of amines suitable for the reaction with the said resin is limited and consequently, such a resin is substantially disadvantageous as compared with the resin corresponding to $n=0-5$.

The term "epoxy resin having an average composition" as used in this specification and in the appended claims means that which has an average composition of all polyepoxy compounds constituting the aforesaid epoxy resin.

Aliphatic amines as referred to in the present invention are polyethylene polyamine such as diethylene triamine, triethylene tetramine, tetraethylene pentamine as well as substituted alkylene diamine such as dimethylaminopropylamine and diethylaminopropylamine, and those amines are known as a curing agent for epoxy resin. Further, aromatic amines which are indispensable ingredients to the present invention together with aliphatic amines, are m-phenylene diamine and/or m-aminophenol.

The said epoxy resin, aliphatic amine and m-phenylene diamine and/or m-aminophenol must be dissolved in a suitable solvent. The solvents having a large dissolving power for the epoxy resin, such as ketone, ester, alcohol, ether, halogenated hydrocarbon and aromatic hydrocarbon are used. Acetone, methyl ethyl ketone, dichloromethane, chloroform, carbon tetrachloride and trichloroethylene are particularly desirable. The mixing of the respective ingredients and the impregnation of reinforcing material may be promoted by the use of solvent and thus a homogeneous product is obtained. The concentration of solution must be such that impregnation is not hindered.

The reinforcing material to be used in the present invention is indispensable for imparting a satisfactory mechanical strength to the membrane, and material having low expansion and contraction and a good resistance to chemicals is generally selected. Textile fabric made of fibers such as glass fiber, polyester obtained by condensing a terephthalic acid with an ethylene glycol and poly- vinylidene chloride are desirable. If the use of these reinforcing materials be dispensed with, it will be impossible to provide a membrane having satisfactory strength, even if all the other features in the present invention were present, and such a membrane as described above will disintegrate or decompose in water within a short time. The use of the reinforcing material not only enhances the strength of products but also is extremely convenient for the operation of making membrane, in particular for the continuous membrane making operation. Further, the use of the reinforcing material makes generally the formation of thinner membrane possible. It is desirable to select a reinforcing material as thin as possible, because a lower resistance per unit area is particularly desired for a diffusion membrane.

The proportions of each ingredient, with which the reinforcing material is impregnated to form a membrane, may be varied in accordance with the object, for which the membrane is used, and with the kind of each ingredient. In general, if the epoxy resin be used in an excessive proportion, the electric resistance of the membrane is increased. If the proportion of m-phenylene diamine and/or m-aminophenol be increased in excess of that required, the physical strength of the membrane is lowered, and if the amount of aliphatic amine is increased over its suitable amount, the production of membrane having excellent electrochemical properties cannot be expected. Favorable results can be obtained when 20 to 70% by weight of epoxy resin, 10 to 40% by weight of aliphatic amine and 10 to 60% by weight of m-phenylene diamine and/or m-aminophenol are used together. The most favorable range of each ingredient is in the following:

20 to 60% by weight of epoxy resin, 15 to 30% by weight of aliphatic amine and 10 to 55% by weight of m-phenylene diamine and/or m-aminophenol.

Means effective to impregnate the overall area of reinforcing material homogeneously with a solution can be used for impregnating the reinforcing material. When the interior part of reinforcing material is not sufficiently impregnated with a solution, it becomes the source of cracks and exfoliation. Either immersing the reinforcing material in a solution or coating the said material with the solution is usually adopted. There is a tendency to cause exfoliation when the amount of the solution adhering to the reinforcing material is excessive and a thick layer of the solution is formed on the surface of the reinforcing material. On the contrary, there is a tendency of decreasing the ion-permselectivity of the membrane when the amount of the solution adhering to the reinforcing material is too small. To obtain the diaphragm for electrodialysis, in which it is required that the diaphragm is selectively permeable to anions and allows the passage of water to be as small as possible, it is desirable to make the membrane somewhat thicker. In case of diaphragm for dialysis a little thinner membrane is desirable. In view of these facts, it is desirable that the immersion and coating are repeated in accordance with the desired products, the composition and the concentration of the solution, and the amount of the solution adhering to the reinforcing material is controlled by means of roller or doctor-knife.

The resin in the reinforcing material is then cured. The curing is usually carried out at a temperature below 250° C. for a few minutes to several tens of hours. It is also favorable to prevent the solvent from too rapid evaporation by preliminary drying before the curing. It is presumed that epoxy resin reacts first with aliphatic amine in the course of the curing, since the reactivity of aliphatic amine on epoxy resin is in general higher than that of aromatic amine. Remaining amino groups, which have not reacted with epoxy resin, mainly those of m-phenylene diamine and/or m-aminophenol react with formaldehyde or acetaldehyde and are condensed to form developed network structure. This treatment is usually accomplished by immersing the membrane in a formaldehyde or acetaldehyde solution acidified with hydrochloric or sulfuric acid, and the time required for the reaction is a few minutes to several tens of minutes at room temperature. Thus, weakly basic insoluble cationic polyelectrolyte in a membrane form is obtained.

It is generally possible to use the weakly basic membrane thus produced as diaphragm for the dialysis and as that for the electrodialysis to be used under an acidic condition, and the membrane having a lower resistance per unit area is particularly suitable for recovering acids from a mixed solution of acids and salts or from a solution of a mixture of acids and water-soluble organic compounds, as in the case of recovering acids from a waste liquid. On the other hand, it is inevitable that the membrane of such a weakly basic insoluble polyelectrolyte increases in its electric resistance in an alkaline solution. Accordingly, when such a membrane is to be used in electrodialysis wherein the solution may possibly become alkaline, it is necessary to convert a weakly basic ion-exchange group to a strongly basic quaternary amine group by the treatment as described below, lest the electric resistance should increase in alkaline solution.

All the known quaternizing means can be adopted as means of converting an anion-exchange group consisting of a primary, secondary or tertiary amine group to a quaternary amine group. Alkyl halides such as methyl iodide, methyl bromide and methyl chloride, dimethyl sulfate, ethylene oxide and others are used for the said object. The weakly basic membrane is immersed in these quaternizing agents or in a solution thereof. The time required for the reaction is usually 1 to 30 hours at a temperature of from room temperature to 50° C. The membrane, which has become strongly basic by the above-mentioned treatment, can be used in all the purposes as a diaphragm for electrodialysis and dialysis.

The invention is further described in the following examples which serve to illustrate the process for the production of insoluble cationic polyelectrolyte in a membrane form of the present invention. The proportions of ingredients used in the following examples are all expressed as a weight portion.

*Example 1*

100 parts by weight of 50% acetone solution of epoxy resin which had been produced by condensation of bis (p-hydroxyphenyl)-propane with epichlorohydrin and had the epoxide equivalent of about 220, were uniformly mixed with 23 parts of triethylene tetramine and 25 parts of 50% acetone solution of m-phenylene diamine. A plain fabric (thickness of 0.1 mm., weight of 70 grm./m.²) of terephthalic acid-ethylene glycol polyester, was immersed in this solution and then withdrawn from the solution, after which the sheet was heated at 85° C. for 3 hours and the resin adhering to the fabric was cured. The resin content (RC) in the cured membrane was 46% by weight and the proportion of the fabric was 54% by weight. The membrane thus treated was then immersed in an aqueous solution consisting of 100 parts of 35% aqueous formaldehyde solution and 5 parts of conc. hydrochloric acid and allowed to stand at room temperature for 30 minutes so that the condensation was completed. The membrane thus produced was rinsed with water several times and then with ½ mol aqueous sodium chloride solution of pH 6.0. The electric resistance of unit area of the membrane was $R=2.6\Omega^{-cm.^2}$ and the transport number of chloride ion thereof was $n=0.92$.

The term "resistance of unit area (R)" used in the present specification means the total electric resistance per cm.² of membrane at equilibrium with ½ mol aqueous sodium chloride solution of pH 6.0 at 25° C. The transport number (n) relates to chloride ions calculated from the membrane potential, which is measured at 25° C. under the condition, in which 1 mol aqueous sodium chloride solution is placed on the one side of the membrane and ½ mol aqueous sodium chloride solution is placed on the other side.

*Example 2*

100 parts of 50% acetone solution of the same epoxy resin as that used in Example 1 were uniformly mixed with 20 parts of tetraethylene pentamine and 100 parts of 50% acetone solution of m-phenylene diamine. Anion permselective membrane was produced using this solution under the same conditions as in Example 1, except that the resin content before the treatment with formaldehyde was adjusted to 52%. In the membrane thus obtained, $R=3.0\Omega^{-cm.^2}$, and $n=0.94$.

*Example 3*

100 parts of 50% acetone solution of epoxy resin of epoxide equivalent of about 260 were uniformly mixed with 25 parts of triethylene tetramine and 50 parts of 50% acetone solution of m-phenylene diamine. A plain fabric made of glass fibers having a thickness of 0.07 mm. was coated with this solution and heated at 85° C. for 3 hours and subsequently heated further at 150° C. for an hour to cure. The members thus obtained, having a resin content of 42% was treated with formaldehyde in the same manner as in Example 1. Anion permselective membrane having $R=2.3\Omega^{-cm.2}$, and $n=0.92$ was obtained.

*Example 4*

To 100 parts of 50% chloroform solution of epoxy resin having an epoxide equivalent of about 190 were added 22.5 parts of curing agent consisting mainly of triethylene tetramine and 50 parts of 40% methyl ethyl ketone solution of m-phenylene diamine. A plain fabric as in Example 1, was immersed in this solution, withdrawn out and thereafter heated in an air thermostat at 150° C. for 30 minutes to cure. Membrane having a resin content (RC) of 43% was obtained. This membrane was treated with acidic aqueous solution of formaldehyde in the same manner as in Example 1 to give an anion permselective membrane having $R=2.3\Omega^{-cm.^2}$ and $n=0.92$.

*Example 5*

To 100 parts of 30% dichloromethane solution of epoxy resin having an epoxide equivalent of about 490 were added 40 parts of 30% acetone solution of m-phenylene diamine and 75 parts of triethylene tetramine. A plain fabric as in Example 1, was immersed in this solution and then withdrawn, after which the said fabric was treated in the same manner as in Example 4. In the membrane thus obtained, $RC=50\%$, $R=3.6\Omega^{-cm.^2}$ and $n=0.91$.

*Example 6*

100 parts of 50% acetone solution of the same epoxy resin as that in Example 1 were uniformly mixed with 25 parts of triethylene tetramine and 50 parts of 50% acetone solution of m-aminophenol. An anion permselective membrane produced, in the same manner as in Example 1, using the said solution had $R=6.7\Omega^{-cm.^2}$ and $n=0.92$. The RC of the membrane after curing was 40%.

*Example 7*

To 100 parts of 50% dichloromethane solution of the same epoxy resin as that in Example 1 were added 15 parts of diethylene triamine and 50 parts of 50% acetone solution of m-phenylene diamine. The same reinforcing material as that in Example 1 was immersed in this solution, withdrawn out and heated in an air thermostat at 150° C. for 30 minutes. The RC of the membrane thus cured was 48%. The membrane was further treated with an acidic aqueous solution of formaldehyde in the same manner as in Example 1 to produce the membrane having $R=4.0\Omega^{-cm.^2}$ and $n=0.95$.

*Example 8*

To 100 parts of 50% dichloromethane solution of the same epoxy resin as in Example 1 were added 40 parts of 50% acetone solution of m-phenylene diamine, 5 parts of tetraethylene pentamine and 25 parts of diethylaminopropylamine. An anion permselective membrane was produced in the same treatment as in Example 7, using the above solution. The membrane thus obtained showed the following properties:

$R=16.0\Omega^{-cm.^2}$ and $n=0.95$. The RC of the cured membrane was 38%.

*Example 9*

100 parts of 50% dichloromethane solution of the same epoxy resin as in Example 1 were mixed with 23 parts of a mixture (mixing ratio 1:1) of triethylene tetramine and tetraethylene pentamine and 42 parts of 50% acetone solution of m-phenylene diamine. A plain fabric having a thickness of 0.1 mm. and a weight of 28 g./m.² was immersed in this solution and then withdrawn. The reinforcing material thus treated was dried in air and then heated at 140 to 150° C. for 7 minutes to cure. The RC of the membrane thus obtained was 65%. This membrane was further treated with an acidic aqueous solution of formaldehyde in the same manner as in Example 1. The membrane thus formed had $R=1.4\Omega^{-cm.^2}$ and $n=0.93$.

The anion permselective membrane thus produced was used as diaphragm and an aqueous solution containing 10% sulfuric acid and 16% glucose was placed on the one side of the membrane and distilled water was placed on the other side thereof, after which they were allowed to stand at 25° C. for 2 hours, in the course of which the sulfuric acid penetrated the membrane in the amount of 30.1 mg./cm.² hr. and glucose penetrated in an amount of 1.0 mg./cm.² hr. That is to say, according to this method a hydrogen ion penetrates together with an anion, namely, sulfate ion, using the anion permselective membrane as diaphragm. Accordingly, acid can be recovered from a mixed solution of acid and glucose. Moreover, this recovering method can be applied not only to the recovery of acid from an aqueous solution of a mixture of other acid and water-soluble organic compound but also to that from a mixed solution of acid and salts as shown below.

The same anion permselective membrane as in the above description, having an available area of 81 cm.² was used and 300 cc. of solution, in which the concentration of sulfuric acid and that of ferrous sulfate are respectively 1.38 N and 1.74 N, was placed on the one side of the said membrane and distilled water of equal quantity was placed on the other side thereof, after which they were allowed to stand at 25° C. for 5.3 hours. As a result thereof, the concentration of sulfuric acid and that of ferrous sulfate in the distilled water amounted respectively to 0.50 N and 0.01 N. Thus, about one third of the amount of sulfuric acid in the initial solution was recovered.

*Example 10*

To 100 parts of 50% acetone solution of epoxy resin as in Example 1 were added 50 parts of 50% acetone solution of m-phenylene diamine and 20 parts of a curing agent as in Example 4. A plain fabric as in Example 1 was immersed in this solution, withdrawn, and after drying in air, the resin was cured at 150° C. Thus, the membrane having an RC of 47% was obtained. Subsequently, this membrane was further treated with a solution containing 20% of acetaldehyde and 2% of hydrogen chloride. The anion permselective membrane thus obtained had $R=8.0\Omega^{-cm.^2}$ and $n=0.93$.

*Example 11*

To 100 parts of 50% acetone solution of epoxy resin as in Example 1 were added 50 parts of 50% acetone solution of m-phenylene diamine and 16 parts of a curing agent as in Example 4. A plain fabric as in Example 1 was immersed in this solution, removed, and then heated at 150° C. for 30 minutes in an air thermostat. The RC of the membrane thus cured was 43%, and the membrane was further treated with an acidic aqueous solution of formaldehyde in the same manner as in Example 1. The membrane thus obtained had the following properties: $R=8.0\Omega^{-cm.^2}$ at pH=5.5, and $R=153\Omega^{-cm.^2}$ and $n=0.95$ at pH=9.0.

This membrane was washed with ½ N aqueous sodium hydroxide solution and thereafter placed in an autoclave and brought into contact with 20% aqueous solution of ethylene oxide at 45 to 50° C. for 6 hours. The properties of the membrane, whose anion-exchange group was converted to a quaternary amine group, were as follows: $R=7.6\Omega^{-cm.^2}$ at pH=5.5, and $R=10.0\Omega^{-cm.^2}$ and $n=0.93$ at pH=9.0.

What I claim is:

1. A process for the production of a membrane of insoluble cationic polyelectrolyte which comprises dissolving an epoxy compound, an aliphatic polyamine and an aromatic amine selected from the class consisting of m-phenylene diamine and aminophenol in a solvent, said epoxy compound having an average composition and being represented by the general formula

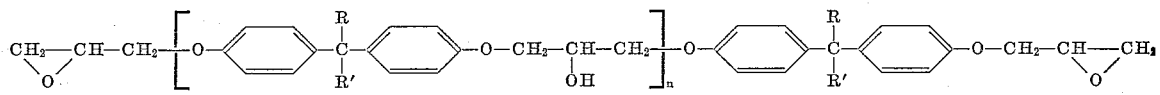

wherein R and R' are selected from the class consisting of H, $CH_3$ and $C_2H_5$ and $n$ is 0 to 5, impregnating a membrane comprising sheet material with the resulting solution, curing the epoxy compound with said amines, and reacting an aldehyde selected from the class consisting of formaldehyde and acetaldehyde with remaining amino groups in the membrane to complete the resinification.

2. A process as claimed in claim 1, wherein 20 to 70% by weight of the epoxy compound, 10 to 40% by weight of the aliphatic amine and 10 to 60% by weight of the member selected from the class consisting of m-phenylene diamine and aminophenol are used together.

3. A process as claimed in claim 1, wherein the said aliphatic polyamine is selected from the class consisting of diethylene triamine, triethylene tetramine, tetraethylene pentamine, polyethylene imine, dimethylaminopropyl amine and diethylaminopropyl amine.

4. A process as claimed in claim 1, wherein the said solvent is selected from the class consisting of ketone, ester, alcohol, ether, halogenated hydrocarbon and aromatic hydrocarbon.

5. A process as claimed in claim 1, wherein the curing is effected for a few minutes to a number of hours at a temperature below 250° C.

6. A process as claimed in claim 1, and quaternizing the anion-exchange groups of the membrane with a quaternizing agent.

7. A process as claimed in claim 6, wherein the quaternizing agent is selected from the class consisting of alkyl halide, dimethyl sulfate and ethylene oxide.

8. A process as claimed in claim 1, wherein R and R' are CH₃ and n is 0 to 3.

9. A process as claimed in claim 8, and quaternizing the anion-exchange groups of the membrane with a quaternizing agent.

10. A process as claimed in claim 8, wherein polyethylene polyamine is used as the aliphthaic polyamine.

11. A process as claimed in claim 9, wherein polyethylene polyamine is used as the aliphatic polyamine.

12. A process as claimed in claim 8, wherein 20 to 70% by weight of the epoxy compound, 10 to 40% by weight of the polyethylene polyamine and 10 to 60% by weight of m-phenylene diamine are used together.

13. A process as claimed in claim 9, wherein 20 to 70% by weight of the epoxy compound, 10 to 40% by weight of the polyethylene polyamine and 10 to 60% by weight of m-phenylene diamine are used together.

14. A process as claimed in claim 12, in which said aldehyde is formaldehyde.

15. A process as claimed in claim 14, and quaternizing the anion-exchange groups of the membrane with a quaternizing agent.

16. A permselective cationic membrane produced by the process of claim 1.

References Cited in the file of this patent
UNITED STATES PATENTS

| | | |
|---|---|---|
| 2,469,684 | Dudley | May 10, 1949 |
| 2,731,425 | Juda | Jan. 17, 1956 |
| 2,844,553 | Taylor | July 22, 1958 |